(12) United States Patent
Burrell et al.

(10) Patent No.: US 7,651,633 B2
(45) Date of Patent: Jan. 26, 2010

(54) NANOPHOSPHORS FOR LARGE AREA RADIATION DETECTORS

(75) Inventors: Anthony K. Burrell, Los Alamos, NM (US); Kevin C. Ott, Los Alamos, NM (US); John C. Gordon, Los Alamos, NM (US); Rico E. Del Sesto, Santa Fe, NM (US); T. Mark McCleskey, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 22 days.

(21) Appl. No.: 11/729,279

(22) Filed: Mar. 27, 2007

(65) Prior Publication Data

US 2008/0011956 A1    Jan. 17, 2008

Related U.S. Application Data

(60) Provisional application No. 60/786,581, filed on Mar. 27, 2006, provisional application No. 60/810,817, filed on Jun. 2, 2006.

(51) Int. Cl.
*C01F 1/00* (2006.01)
*C01F 17/00* (2006.01)
*C09K 11/85* (2006.01)

(52) U.S. Cl. .................. 252/301.4 H; 423/263; 977/776; 977/773; 977/832

(58) Field of Classification Search ......... 252/301.4 R, 252/301.4 H, 301.4 S; 423/263; 977/832, 977/776, 773
See application file for complete search history.

(56) References Cited

U.S. PATENT DOCUMENTS

| | | | |
|---|---|---|---|
| 4,362,946 A | 12/1982 | Cusano et al. | |
| 5,637,258 A * | 6/1997 | Goldburt et al. | 252/301.4 R |
| 5,958,367 A | 9/1999 | Ying et al. | |
| 6,126,740 A * | 10/2000 | Schulz et al. | 117/4 |
| 6,251,303 B1 * | 6/2001 | Bawendi et al. | 252/301.4 R |
| 6,649,138 B2 * | 11/2003 | Adams et al. | 423/403 |
| 6,699,406 B2 | 3/2004 | Riman et al. | |
| 6,734,465 B1 | 5/2004 | Taskar et al. | |
| 6,777,479 B1 | 8/2004 | Bernard et al. | |
| 7,094,361 B2 | 8/2006 | Riman et al. | |
| 7,105,832 B2 | 9/2006 | Dai et al. | |
| 7,145,149 B2 | 12/2006 | Cooke et al. | |
| 2003/0157021 A1 | 8/2003 | Klavenass et al. | |
| 2004/0174917 A1 * | 9/2004 | Riman et al. | 372/43 |

(Continued)

FOREIGN PATENT DOCUMENTS

WO    WO 2007/082663    *    7/2007

OTHER PUBLICATIONS

Cooke et al., "Luminescent Properties and Reduced Dimensional Behavior of Hydrothermally Prepared $Y_2SiO_5$:Ce Nanophosphors," Applied Physics Letters, vol. 88, Mar. 2006, pp. 103108-1 through 103108-3.

(Continued)

*Primary Examiner*—C. Melissa Koslow
(74) *Attorney, Agent, or Firm*—Samuel L. Borkwosky (57) ABSTRACT

Nanophosphor compositions were prepared. The compositions can be used for radiation detection.

4 Claims, 4 Drawing Sheets

U.S. PATENT DOCUMENTS

| | | |
|---|---|---|
| 2005/0264811 A1 | 12/2005 | Bi et al. |
| 2005/0265922 A1 | 12/2005 | Nie et al. |
| 2006/0231797 A1 | 10/2006 | Riman et al. |
| 2006/0265922 A1 | 11/2006 | Shaffer, Jr. |
| 2008/0128624 A1* | 6/2008 | Cooke et al. ............ 250/361 R |
| 2008/0241040 A1* | 10/2008 | Clothier et al. ............. 423/263 |
| 2008/0241041 A1* | 10/2008 | Clothier et al. ............. 423/263 |

OTHER PUBLICATIONS

Chander, "Development of Nanophosphors—A Review," Materials Science and Engineering R, vol. 49, issue 5, Jun. 2005, pp. 113-155.

Stouwdam et al., "Improvement in the Luminescence Properties and Processability of $LaF_3/Ln$ and $LaPO_4/Ln$ Nanoparticles by Surface Modification," vol. 20, Dec. 2004, pp. 11763-11771.

Stouwdam et al., "Near-infrared Emission of Redispersible $Er^{3+}$, $Nd^{3+}$, and $Ho^{3+}$ Doped $LaF_3$ Nanoparticles," Nano Letters, Jul. 2002, vol. 2., No. 7, pp. 733-737.

Zhou et al., "Study on an Antiwear and Extreme pressure additive of surface coated $LaF_3$ Nanoparticles in Liquid Paraffin," Wear 249, Jun. 2001, pp. 333-337.

Khan et al., "Interaction of Binders with Dispersant Stabilized Alumina Suspensions," Colloids and Surfaces, vol. 161, Jun. 2000, pp. 243-257.

Lindner et al., "Luminescence and Damage Thresholds of Cerium-Doped $LaF_3$ for Ns-pulsed Laser Excitation at 248 nm," Applied Physics B, vol. 68, Feb. 1999, vol. 68, pp. 233-241.

Thoma et al, "EPR and Luminescence Studies of $LaF_3$ and $CeF_3$ Under X-ray and Laser Irradiation," Journal of Luminescence, vol. 71, Mar. 1997, pp. 93-104.

Rodnyi et al., "Fast Luminescence of Cerium Doped Lanthanum Fluoride," Journal of Luminescence, vol. 65, Jul. 1995, pp. 85-89.

Wojtowicz et al., "Optical Spectroscopy and Scintillation Mechanisms of $Ce_xLa_{1-x}F_3$," Physical Review B, vol. 49, No. 21, Jun. 1994, pp. 14880-14895.

Schipper et al., "On the Recombination Mechanism in X-ray Storage Phosphors Based on Lanthanum Fluoride," Journal of Luminescence, vol. 59, Jul. 1994, pp. 377-383.

Pedrinit et al., "One-and two-Photon Spectroscopy of $Ce^{3+}$ ions in $LaF_3$-$CeF_3$ Mixed Crystals," J. Phys: Condens. Matter 4, Jun. 1994, pp. 5461-5470.

Anderson, "Cerium Fluoride: A Scintillator For High-Rate Applications," Nuclear Instruments & Methods in Physics Research, vol. A287, No. 3, Feb. 1990, pp. 606-612.

Moses et al., "The Scintillation Properties of Cerium-Doped Lanthanum Fluoride," Nuclear Instruments & Methods in Physics Research, vol. A299, May 1990, pp. 51-56.

Yang et al., "uv Fluorescence of Cerium-Doped Lutetium and Lanthanum Trifluorides, Potential Tunable Coherent Sources From 2760 to 3220 A," Applied Physics Letters, vol. 31, No. 9, Nov. 1977, pp. 594-596.

Cheetham et al., "A Powder Neutron Diffraction Study of Lanthanum and Cerium Trifluorides," Acta Cryst., Jan. 1976, vol. B32, pp. 94-97.

Elias et al., "Excitation of uv Fluorescence in $LaF_3$ Doped with Trivalent Cerium and Praseodymium," Physical Review B, vol. 8, No. 11, Dec. 1973, pp. 4989-4995.

* cited by examiner

NANOPHOSPHORS FOR LARGE AREA RADIATION DETECTORS

RELATED APPLICATIONS

This application claims the benefit of U.S. Provisional Patent Application Ser. No. 60/786,581 entitled "Nanocomposite Scintillator, Detector, and Method, filed Mar. 27, 2006, and U.S. Provisional Patent Application Ser. No. 60/810,817 entitled "Nanophosphors for Large Area Radiation Detectors," filed Jun. 2, 2006, both hereby incorporated by reference.

STATEMENT REGARDING FEDERAL RIGHTS

This invention was made with government support under Contract No. DE-AC51-06NA25396 awarded by the U.S. Department of Energy. The government has certain rights in the invention.

FIELD OF THE INVENTION

The present invention relates generally to radiation detection and more particularly to the preparation of nanophosphors, nanophosphor composites, and radiation detectors that employ the nanophosphors.

BACKGROUND OF THE INVENTION

Phosphors are currently used in many important devices such as fluorescent lamps, RGB (red, green, blue) screens, lasers, and crystal scintillators for radiation detectors, radiographic imaging, tagging and other security applications, lighting applications, and nuclear spectroscopy. Perhaps the most important property of any phosphor is its brightness, i.e. its efficiency, which is the ratio of the number of optical photons emitted by the phosphor to the energy absorbed. Other important properties include the spectral region of maximum emission (which should match commonly-used photodetectors), optical absorption (minimum self-absorption is desired), decay time of the emission (for some applications fast is desired), and the density. In general, superior scintillators exhibit high quantum efficiency, good linearity of the spectral emission with respect to incident energy, high density, fast decay time, minimal self-absorption, and high effective Z-number. Specific scintillator applications determine the choice of phosphor. Scintillators used for active and passive radiation detection, for example, require high density, and brightness, whereas scintillators used for radiographic imaging also require fast decay time.

An exceptionally good scintillator is cerium-activated lutetium oxyorthosilicate. This material has been conveniently abbreviated in the art as either LSO:Ce or Ce:LSO. LSO:Ce is a crystalline solid that includes a host lattice of lutetium oxyorthosilicate ($Lu_2SiO_5$, abbreviated LSO) that is activated by a small amount of the rare-earth (RE) metal dopant cerium (Ce). Cerium is an excellent activator because both its 4f ground and 5d excited states lie within the band gap of about 6 eV of the host LSO lattice. LSO:Ce is very bright, i.e. it has a very high quantum efficiency. LSO:Ce also has a high density (7.4 $gm/cm^3$), a fast decay time (about 40 nanoseconds), a band emission maximum near 420 nanometers, and minimal self-absorption.

While the scintillator properties of LSO:Ce are exceptional, high-quality single crystals are difficult and expensive to prepare. The high cost, which is at least partly due to the high cost of starting materials (high purity $Lu_2O_3$ powder) and equipment (iridium crucibles for containing the $Lu_2O_3$ powder that melts at about 2150 degrees Celsius), and the tendency of the crystal boule to form cracks that limit the amount of usable single crystal from the boule, limits efforts to develop other types of crystals with an LSO host lattice.

Other exceptionally good scintillators include rare earth doped lanthanum halides, such as cerium-doped lanthanum fluoride, lanthanum chloride, lanthanum bromide, and cerium-doped lanthanum mixed halides. A lanthanum halide host doped with an appropriate phosphor such as Ce(III), for example, is of interest as a scintillator for large-scale radiation detectors.

Light output from nanophosphors has been shown to increase compared to larger phosphors in several systems. In addition, when nanoparticles are used in plastic scintillators, their small size results in reduced light scattering, and hence less attenuation. Nanoparticle phosphors with these properties are less expensive than single crystals to prepare, and could be used to prepare radiation scintillators where detection of radiation over large areas is required. Crystalline lanthanide halide nanophosphors, for example, have attracted recent interest due to their potential uses in optics and optoelectronics (e.g., lighting and displays, optical amplifiers/scintillators, and lasers), microelectronics, and tribology. A particular current interest is their possible use for large-scale scintillators for applications related to homeland security and medical imaging.

Currently, methods for producing micron sized to nano-sized particles of rare earth doped or undoped lanthanum halides are limited. Nanoparticles with mean particle sizes below 10 nm of rare earth doped lanthanide oxides, orthosilicates or halides may be prepared using single source precursor, hydrothermal, spray pyrolysis or solution combustion methods (see, for example, Chander in "Development of Nanophosphors—a Review", Mat. Sci. Eng., vol. R 49, (2005) pp. 113-155, incorporated by reference herein). These particles must then be dispersed in an appropriate medium to prevent agglomeration.

There is a need for better methods for preparing high-quality monodisperse, well shaped, single-crystalline nanoparticles, and also for inexpensive large area, high output radiation detectors.

SUMMARY OF THE INVENTION

In accordance with the purposes of the present invention, as embodied and broadly described herein, the present invention includes a composition comprising nanophosphor particles capped with a ligand. The nanophosphor particles have a size P wherein P≦20 nanometers. The composition has at least one lanthanide and at least one halide. The weight percent of the lanthanide phosphor is N wherein N≧5 percent. The light transmission of the composition is C wherein C≧50 percent.

The invention also includes a detector. The detector includes a composition comprising nanophosphor particles capped with a ligand. The nanophosphor particles have a size P wherein P≦20 nanometers. The composition has at least one lanthanide and at least one halide. The weight percent of the lanthanide phosphor is N wherein N≧5 percent. The light transmission of the composition is C wherein C≧50 percent. The composition is optically coupled to a photodetector that detects light emitted from the nanophosphor particles of the composition.

The invention also includes a method for preparing a lanthanide halide nanophosphor. The method includes preparing a first solution comprising at least one lanthanide triflate precursor dissolved in an ionic liquid solvent that is a good solvent for the at least one soluble lanthanide triflate complex but a poor solvent for the lanthanide halide nanophosphor, and adding the first solution dropwise to a second solution of a source of acidic halide under conditions suitable for a chemical reaction to occur that results in a product that comprises a lanthanide halide nanophosphor. Embodiments with possible lanthanide triflate precursors, ionic liquid solvents, sources of acidic halide, and suitable reaction conditions are provided later, e.g. in the EXAMPLES (vide infra).

The invention also includes a method for preparing a nanophosphor that involves reacting $Ln_2O_3$ nanoparticles with a source of acidic halide, wherein Ln comprises at least one lanthanide, wherein halide comprises fluoride, chloride, bromide, iodide, or mixtures thereof.

The invention also includes a method for preparing a transparent nanocomposite of nanoparticles and capping ligand. The method includes preparing a composition of nanoparticles and capping ligand in a liquid, and centrifuging the composition at a speed chosen to separate the composition into a supernatant and a fraction that comprises the nanocomposite.

The invention also includes a method for preparing a nanophosphor, comprising: preparing a first solution comprising at least one lanthanide precursor having a basic ligand, and combining the first solution with a second solution having source of acidic halide, a chalcogenide source, or a mixture thereof.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1b shows a transmission electron microscope (TEM) image of the nanocomposite of FIG. 1a.

FIG. 2 shows an X-ray diffraction (XRD) spectrum of the nanocomposite scintillator of FIG. 1a.

FIG. 3 shows photoluminescence excitation (dashed line) and emission spectra (solid line) of the Ce doped $LaF_3$ doped nanocomposite of FIG. 1a.

FIG. 5b shows a TEM image of the nanocomposite of FIG. 5a.

DETAILED DESCRIPTION

The invention is concerned with the preparation of nanophosphors, and also with detectors that employ the nanophosphors. Nanophosphors of this invention are fast, bright, dense scintillators. Large area detectors (e.g. detectors useful for medical imaging or monitoring large objects such as shipping containers, boats, planes, etc.) may be prepared more easily using these fast, bright, dense nanophosphors than using single crystal scintillators. The brightness provides a detector of the invention with optimal light output, and the high density provides the detector with stopping power for the x-rays, gamma rays, neutrons, protons, or the like. Also, nanophosphors of the invention are inexpensive compared to more conventional spectroscopic detector materials.

Nanophosphors of the invention include monodisperse, or nearly monodisperse, doped or undoped lanthanide halides (halide=fluoride, chloride, bromide or iodide). Nanophosphors of the invention also include lanthanide chalcogens (chalcogen=oxygen, sulfur, selenium, tellurium). In an embodiment, nearly monodisperse nanophosphors were prepared from lanthanide triflate precursors. In this embodiment, lanthanide triflate is subjected to certain reaction conditions in the presence of a capping ligand and a source of acidic halide. The source of acidic halide participates in the removal of triflate from the lanthanide triflate precursor, and also with transfer of halide(s) to the lanthanide. A typical capping ligand is a relatively high boiling material that can chemically coordinate to the lanthanide and aid in controlling the nucleation and growth of the nanophosphor. The capping agent may also electrostatically interact with surfaces of the nanoparticles.

In another embodiment, nanophosphors may be prepared from lanthanide alkoxide or aryloxide precursors. In this embodiment, lanthanum alkoxides or aryloxides are subjected to certain reaction conditions in the presence of a capping ligand and a source of acidic halide. The source of acidic halide participates in the removal of alkoxide or aryloxide from the lanthanide alkoxide or lanthanide aryloxide precursor, and also with the transfer of halide(s) to the lanthanide. A typical capping ligand is a relatively high boiling material that can chemically coordinate to the lanthanide and aid in controlling the nucleation and growth of the nanophosphor.

This general method will utilize the degradation of a lanthanide alkoxide or aryloxide complex in the presence of a capping ligand (a suitable high boiling and/or coordinating solvent which will be used to control particle nucleation and growth) and a suitable source of acidic halide (which will both serve to remove the alkoxide or aryloxide ligand from the precursor and to transfer the halides to the lanthanide ion). These small particles when either pressed into a powder or dispersed in a plastic material, form the basis for a large scale, large area radiation detector. For example, a lanthanide alkoxide such as $(La(O-neopentyl)_3)_4$ that is soluble in apolar solvents, and reacts in a 'poor' solvent with methyl imidazole in the presence of a halide source. The source of acidic halide (pyridinium bromide, chloride, iodide, for example) is soluble in methyl imidazole. Interaction of the pyridinium salt with the lanthanide alkoxide results in the generation of the lanthanide halide, and because the solvent is not suitable to keep the lanthanide halide in solution, it nucleates, and small particles form. Particle growth could be controlled by the addition of a 'blocking' ligand, to shut down crystal growth at a certain size. To obtain a phosphor, a light emitting lanthanide is doped into an inert lanthanide host. For example, a few percent to several percent Ce(III) alkoxide is mixed with $(La(ON p)_3)_4$ to produce a cerium doped lanthanum halide. Control over the nucleation and growth (and hence particle size), an appropriate surface capping with either ligands or additional inert lanthanum halide is used to optimize the light output of the phosphor. This lanthanide halide is suitable for pressing into a compact form, or dispersing in a plastic or glass composite having suitable properties for light transmission to prepare a large area scintillator body.

This general method will also utilize the degradation of a lanthanide alkoxide, aryloxide, or amide or imide complex in the presence of a capping ligand (a suitable high boiling and/or coordinating solvent) and a source of acidic halide selected from a haloacid (hydrochloric acid, hydrobromic acid, for example) or an organic acid (ammonium chloride, diethylammonium bromide, oleic acid, for example) The source of acidic halide assists in the removal of the ligand (alkoxide, aryloxide, or amide or imide), and the halide substitutes onto the lanthanide, resulting in a lanthanide halide complex.

In an embodiment, nanophosphors are prepared from base stabilized lanthanum halide precursors (for example, $LnI_3(THF)_4$ and $LnI_3(^iPrOH)_4$. The precursors are thermally decomposed in the presence of a capping ligand in a relatively high boiling solvent. In some cases, the capping ligand also acts as the solvent. The capping ligand promotes the expulsion of coordinate ligands (iodide in the case of $LnI_3(THF)_4$ and $LnI_3(^iPrOH)_4$) is also believed to control the precipitation and/or growth of nanoparticles that form.

An example of a high light output, scintillating nanophosphor prepared according to this embodiment is cerium-doped lanthanum fluoride capped with oleic acid. In this example, a nanophosphor was prepared by adding sodium fluoride to an aqueous solution of lanthanum chloride and cerium nitrate in the presence of oleic acid. Other capping agents (citric acid, for example) may be employed.

In another example, a cerium doped lanthanum bromide nanophosphor was prepared using an ionic liquid solvent. In this example, the ionic liquid behaves like a poor solvent, similar to the water in the previous examples. The ionic liquid in this example dissolves a lanthanide triflate complex and pyridinium bromide, which is the source of the halide (in this case, halide is bromide). The product nanophosphor, on the other hand, was insoluble in the ionic liquid.

In other examples, nanophosphors of mixed halides (chloride and bromide; bromide and iodide, and the like) may be prepared. For example, a mixed halide is prepared using a mixture of pyridinium bromide and pyridinium chloride with lanthanum triflate in a solvent to give a mixed halide nanophosphor. Alternatively, layered nanophosphors may be prepared by sequential addition of a first halide source (CTAB, cetyl trimethylammonium bromide, for example), and then a second halide source (CTAC, cetyl trimethylammonium chloride, for example).

In an embodiment, a nanophosphor of the invention includes a core portion surrounded by a shell. The core may include a single doped lanthanide halide, or a mixture of lanthanide halides. The core may also include a single undoped lanthanide halide. In an embodiment, the core may include a material other a lanthanide halide (a semiconductor, an elemental metal or metal oxide, for example). The shell may include, for example, a single layer of a doped lanthanide halide material, or a single layer of undoped lanthanide material. The shell may also include a material other than a lanthanide halide (a semiconductor, an elemental metal or metal oxide, for example). A nanophosphor of the invention may include, for example, a core of cerium doped lanthanum fluoride ($LaF_3$:Ce) and a shell of zinc oxide. The outside of the shell may or may not be capped with a capping agent.

It should be understood that the choice of lanthanides and dopants are not limited to lanthanum (La) and cerium (Ce), and that any lanthanide capable of functioning as an inert host into which an emitting ion may be doped, may be used with the invention. The choice of lanthanide may be tailored in order to prepare a chosen nanophosphor having desired emission properties.

The lanthanide halide may be a single lanthanide compound where the lanthanide acts as its own dopant (cerium bromide, for example).

Another aspect of the invention is concerned with nanophosphors that do not contain a lanthanide. For example, nanophosphors may include one or more transition metals (tungsten, zirconium, osmium, gold, iron, ruthenium, manganese, and the like) and/or main group elements such as, but not limited to, bismuth, lead, thallium, mercury, and the like).

An aspect of the invention is concerned with controlling the particle size of the nanophosphor, which is important for the preparation of monodisperse, or nearly monodisperse, nanophosphors. In an embodiment, using a combination of heat and ammonium halide salts (CTAB, cetyl trimethylammonium bromide, for example) as a halide source, and other parameters, a product of monodisperse, or nearly monodisperse nanophosphors is produced. Nanophosphors of the invention may be prepared having particle sizes less than about 100 nanometers, less than about 50 nanometers, and less than about 20 nanometers. Preferably, nanophosphors of the invention have particle sizes of about 10 nanometers or less. Improved light output and transport are expected for nanophosphors having a particle size less than about 20 nanometers (nm).

Product nanophosphors of the invention that include capping agents can be molded into controlled three-dimensional shapes of varying sizes wherein the thickness is easily controllable and may be adjusted depending on a particular application. In some cases, the capping agent portion can be cross-linked using common cross-linking procedures (for example, by using light, heat, electrons, or chemicals).

The product nanophosphors of the invention can also be mixed with other materials (polymer, glass, wax, and the like). These other materials, which are sometimes referred to herein as matrix materials and/or binders, are preferably transparent to light emission from the nanophosphor component. The combination of a binder and nanophosphor is sometimes referred to herein as a nanocomposite scintillator.

A nanocomposite scintillator of the invention may be prepared in a wide variety of shapes using known processing techniques commonly used for preparing films, coatings, tubes, rods, fibers, spheres, and other structures. Nanocomposite scintillators of the invention can be made very large. The nanophosphor may be pressed into a body, or dispersed in a plastic material, and in this form used in a large area radiation detector, or in an emissive device (for example, a device useful for lighting applications). In an aspect of the invention, the nanocomposite scintillator can be tailored to emit light in a spectral region that matches the optimum response of photomultipliers (about 400 nanometers) or photodiodes (about 550 nanometers), which maximizes the overall efficiency of the radiation detector (which includes the typical detector elements such as power supplies, current meters, photomultiplier tubes, photodiodes, etc.).

A nanocomposite scintillator of the present invention combines the high stopping power and photoelectric cross section of inorganic crystalline scintillators with the processing costs of plastic scintillators. Nanocomposite scintillators of the invention may be prepared by, for example, dispersing nanophosphor in a matrix material, or by hot pressing or other mechanical and thermal treatment of nanophosphor to form a monolithic structure. The resulting nanocomposite scintillator must be suitably transparent and preserve the intrinsic brightness of the nanophosphor. It should also homogeneously accommodate additives if additives are used. Additives may include wavelength shifting compounds, surfactants, index matching additives, sintering inhibitors, and the like.

Matrix materials useful for preparing nanocomposites of the invention include those where 1) the refractive index of the matrix is not matched to the refractive index of the nanophosphor; and 2) the refractive index of the matrix is matched to the refractive index of the nanophosphor. Selection of an appropriate nanophosphor and binder for a nanocomposite scintillator for a particular application is also based on parameters that include, but are not limited to, the mean particle size, particle size distribution, thermal stability, chemical stability and degree and type of agglomeration present in the nanophosphor material.

In an embodiment, a matrix material used in preparing a nanocomposite of the invention has an index of refraction that closely matches the index of refraction of the nanophosphor, and is transparent to the wavelength of emission of the nanophosphor. If the indices are exactly, or nearly, matched, attenuation from optical scattering will become negligible. A nanocomposite of cerium-doped lanthanum fluoride ($LaF_3$: Ce), which has an index of refraction of about 1.60, and polystyrene (1.59) is an example of such a nanocomposite.

A nanophosphor of $Y_2O_3$:Tb (1.0 mol %) with an average primary particle size of 30 nm and the presence of hard agglomerates, for example, would require an index matched binder (i.e. matrix material). By contrast, a nanophosphor of $LaBr_3$:Ce (1.0 mol %) with an oleic acid capping agent and an average primary particle size of about 3 nm would not need an index matched matrix material.

Agglomeration may also be prevented or minimized by adding surfactants (CTAB, for example) to the matrix (see, for example, Khan et al. "Interactions of binders with dispersant stabilized alumina suspensions", Colloids. Surf. A., vol. 161, (2000) pp. 243-257, incorporated by reference herein).

Nanophosphors of the invention may be used in radiation detectors, especially detectors having a large area or volume. Some of the possible radiation detector configurations include mounting the nanocomposite scintillator directly onto the face of a photomultiplier with optical coupling grease, or a gap, or an adhesive; mounting the nanocomposite scintillator directly onto the face of a photodiode with optical coupling grease; mounting a large area nanocomposite scintillator onto light-pipe material that directs the scintillation light to one or more photomultiplier tubes or photodiodes; and indirect coupling of the scintillation light to fiber optics, which transmits the light to a photodiode, photomultiplier tube or CCD camera. Some of these configurations may be more easily implemented using a nanocomposite scintillator prepared with a flexible binder (polydimethylsiloxane (PDMS) for example).

By selecting the appropriate rare earth dopant, the light emission from the radiation detector can be tailored for either a photomultiplier or a photodiode.

Nanocomposites and detectors of the present invention may be used for large-area radiation detection portal monitors, shipping containers, medical imagers, and other applications where large area radiation detection is employed.

There currently is a need for relatively inexpensive flexible detectors for portal monitors related to the need for increased transportation security at airports, seaports, and bus and rail terminals, especially after the September 11 attack on the World Trade Center. The radiation detectors of this invention may be used for these types of monitors. The nanocomposites may also be used in radiation detectors for interrogation of complex and irregular shapes.

Current large-area radiographic devices are based on pixelated single crystals. These devices suffer from disadvantages associated with non-uniform light output over the large area of the detector, and from the dark contrast lines that result from the seams between the pixels. Another significant problem associated with the production of pixelated detectors relates to the difficulty in producing pixels; some materials, such as the known scintillator $Gd_2SiO_5$:Ce (GSO:Ce) single crystals are micaceous and cannot be easily cut into pixels and polished for use in radiographic imaging. By contrast, the nanocomposite scintillators of this invention have a relatively uniform light output and can be made seamless over a large area, thereby providing solutions to the aforementioned existing problems associated with pixelated detectors. Nanocomposites of the invention can be used in detectors for proton and neutron radiography, for positron emission tomography, and for medical radiography.

Monodisperse nanophosphor with a particle size less than 20 nm, have a calculated optical attenuation length greater than 1 mm at emission wavelengths of interest, for a ratio of the phosphor index of refraction to the binder index of refraction of 1.8/1.59 or less (i.e. the binder). Preferred nanophosphor properties are a primary particle size of 10 nm or less, and the ability to make agglomerate free, chemically and physically stable dispersions. Stable dispersions of oxide nanophosphors can be made by, for example, careful control of the pH of the dispersing media. For hygroscopic salts like $LaX_3$ where X=Cl, Br, I, the use of surfactant modifiers such as oleic acid or n-butanol with cetyltrimethylammonium bromide in dry solvents such as acetone, toluene, hexane, isooctane or dichloromethane allows stable dispersions to be formed, via a reverse-micelle reaction. Alternately, single-source precursors containing the lanthanide and halide in the correct proportion can be thermally decomposed using hot octadecanol, dioctyl phthalate, hexadecylamine, tri-n-octylphosphine oxide, or 4-ethylpyridine. The two latter examples solvents can also augment the surfactant since they readily form capping layers on a variety of inorganic nanoparticles.

The following TABLE summarizes data for some embodiment lanthanide halide nanophosphor composites.

| Nanocomposite Formula | Ce(III) (ICP) mol % | La(III) (ICP) mol % | Oleic (ICP) Equiv. | Ce:LaF3 in comp, mol % | Ce:LaF3 in comp, vol % | Density of comp, g/cc |
|---|---|---|---|---|---|---|
| $La_1F_3 \cdot 0.34$(oleic) | 0.0 | 100.0 | 0.34 | 67% | 24%* | 2.07 |
| $Ce_{0.11}La_{0.89}F_3 \cdot 0.31$(oleic) | 10.7 | 89.2 | 0.31 | 69% | 26%* | 2.15 |
| $Ce_{0.12}La_{0.88}F_3 \cdot 0.14$(oleic) | 12.3 | 87.6 | 0.14 | 83% | 44%* | 3.05 |
| $Ce_{0.19}La_{0.81}F_3 \cdot 0.05$(oleic) | 18.9 | 81.0 | 0.06 | 92% | 64%** | 4.07 |
| $Ce_{0.19}La_{0.81}F_3 \cdot 0.09$(oleic) | 19.1 | 80.8 | 0.09 | 88% | 53%** | 3.53 |
| $Ce_{0.20}La_{0.80}F_3 \cdot 0.22$(oleic) | 20.3 | 79.6 | 0.22 | 76% | 33%* | 2.51 |
| $Ce_{0.19}La_{0.81}F_3 \cdot 0.24$(oleic) | 19.1 | 80.8 | 0.24 | 74% | 31%* | 2.41*** |
| $Ce_{0.19}La_{0.81}F_3 \cdot 0.21$(oleic) | 18.7 | 81.2 | 0.21 | 77% | 34%* | 2.56 |
| $Ce_{0.42}La_{0.58}F_3 \cdot 0.07$(oleic) | 42.0 | 57.9 | 0.07 | 90% | 59%* | 3.80 |
| $Ce_{0.42}La_{0.58}F_3 \cdot 0.18$(oleic) | 41.8 | 58.1 | 0.18 | 80% | 38%* | 2.74 |
| $Ce_{0.62}La_{0.38}F_3 \cdot 0.28$(oleic) | 61.6 | 38.3 | 0.28 | 71% | 28%* | 2.25 |
| $Ce_{0.81}La_{0.19}F_3 \cdot 0.16$(oleic) | 81.2 | 18.7 | 0.16 | 82% | 41%* | 2.88 |

-continued

| Nanocomposite Formula | Ce(III) (ICP) mol % | La(III) (ICP) mol % | Oleic (ICP) Equiv. | Ce:LaF3 in comp, mol % | Ce:LaF3 in comp, vol % | Density of comp, g/cc |
|---|---|---|---|---|---|---|
| CeF$_3$•0.13(oleic) | 100.0 | 0.0 | 0.13 | 84% | 45%* | 3.08 |

*Sample is a transparent wax (Centrifuge speed 1300 G)
**Sample is not transparent (Centrifuge speed 3500 G)
***Density measured by water displacement is 2.44 g/cc In the TABLE, the formula for the nanocomposite appears in the first column. These materials contain cerium, lanthanum, fluoride, and oleic acid. The amount of oleic acid varies from 0.05 equivalents to 0.34 equivalents. The mol percent of cerium appears in the second column, and the mol percent of lanthanum appears in the third column. The mol percentage of the lanthanide halide in the composite appears in the fifth column, and the volume percentage appears in the sixth column. The density of each of the composites appears in the last column. Some of the composites are transparent waxes. Some of the composites are not transparent. The densities of the composites were calculated except for the density of entry number 7 (Ce$_{0.19}$La$_{0.81}$F$_3$(oleic acid)$_{0.24}$), which was measured by water displacement.

The following EXAMPLES illustrate preparations and properties of several embodiment nanophosphors.

EXAMPLE 1

Figure 1A:
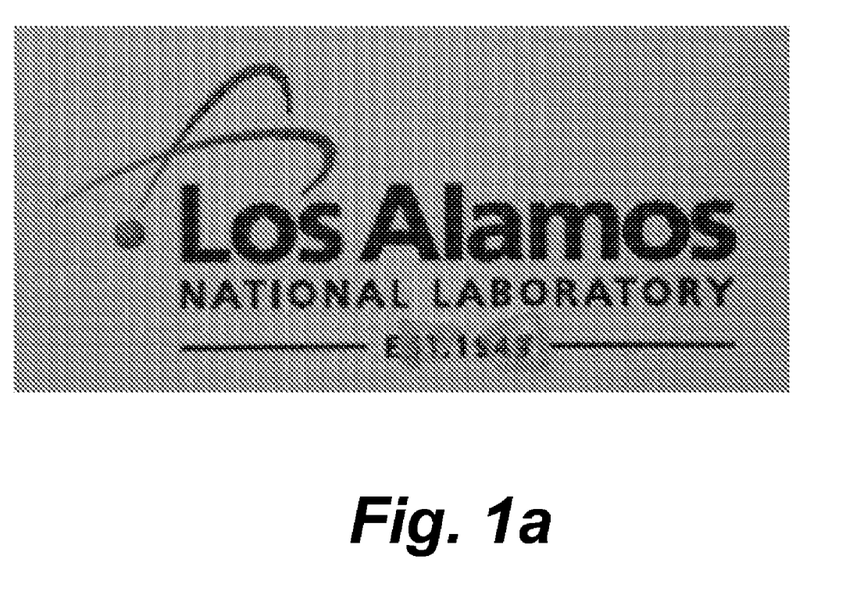
FIG. 1a shows a photographic image of two pieces of the cerium doped transparent nanocomposite scintillator Ce:$LaF_3$(oleic acid).
Figure 1B:
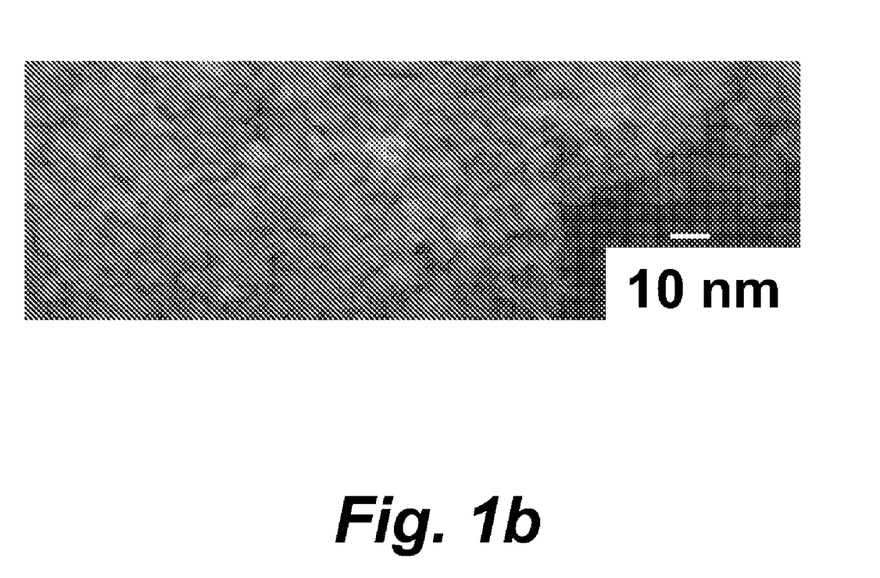

An embodiment composition of lanthanum fluoride doped with cerium (20 mol percent cerium) and having 1 equivalent of capping oleic acid ligand was prepared as follows: A first solution of LaCl$_3$.7H$_2$O (3.85 grams, 10.4 mmol) and Ce(NO$_3$)$_3$.6H$_2$O (1.0 gram, 2.3 mmol) in deionized water (80 milliliters) was prepared. A second solution of sodium fluoride (1.6 grams, 38.1 mmol) and oleic acid (3.6 grams, 12.1 mmol) in 200 ml of 1:1 water:ethanol solvent was also prepared. After the second solution was heated to a temperature of about 78 degrees Celsius, the first solution was added dropwise to the second solution over a period of about 30 minutes, resulting in the slow formation of a waxy white precipitate. The reaction mixture was allowed to stir at about 78 degrees Celsius for an additional hour, and then cooled to room temperature. The liquid portion was decanted from the solid, after which the solid was washed by sonication in about 100 milliliters of ethanol for about 30 minutes. The resulting slurry was subjected to centrifugation at about 3000 rpm for about 30 minutes. The ethanol portion of the centrifugate was decanted from the white solid. The washing and centrifugation procedure was repeated four times. The solid was then dried at room temperature overnight. The product was a transparent scintillator of the cerium doped lanthanum fluoride nanocomposite LaF$_3$:Ce(oleic acid). An image of two pieces of the transparent nanocomposite is shown in FIG. 1a, and a transmission electron microscope (TEM) image is shown in FIG. 1b. As FIG. 1b shows, the sizes of particles of the nanocomposite are less than about 10 nanometers.

Figure 2:
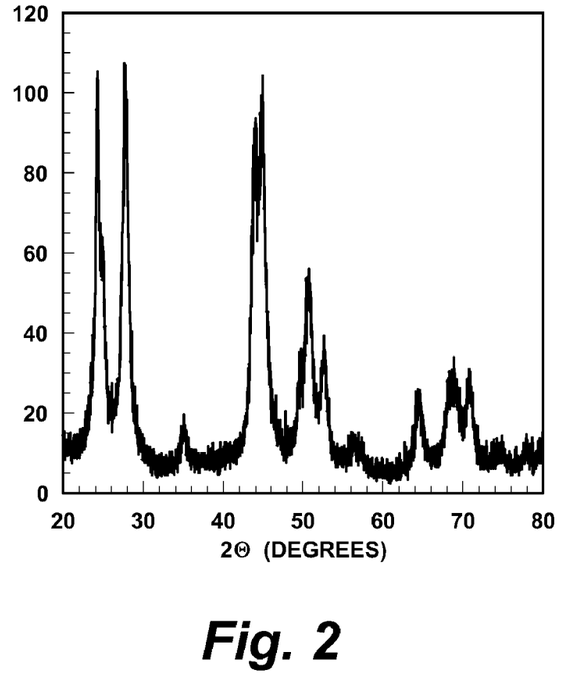

An x-ray diffraction (XRD) spectrum of the nanocomposite is shown in FIG. 2. The XRD pattern of LaF$_3$:Ce shows the expected lines of the tysonite structure, and the absence of other lines indicates high phase purity.

Figure 3:
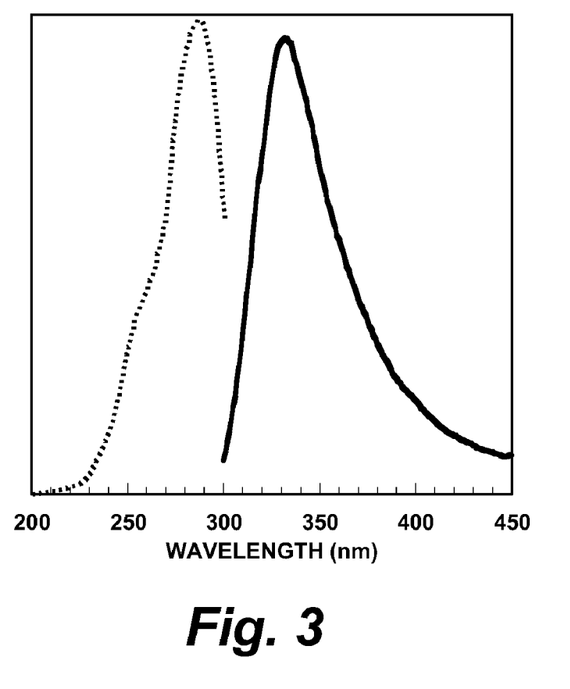

FIG. 3 shows photoluminescence excitation (dashed line) and emission spectra (solid line) of the Ce doped LaF$_3$ doped nanocomposite. According to the spectra, excitation peaks are present at 255 and 287 nm, and an emission band maximum occurs at 332 nm. It is believed that the luminescence corresponds to electronic transitions of the Ce$^{3+}$ ion (4f5d states).

Figure 4:
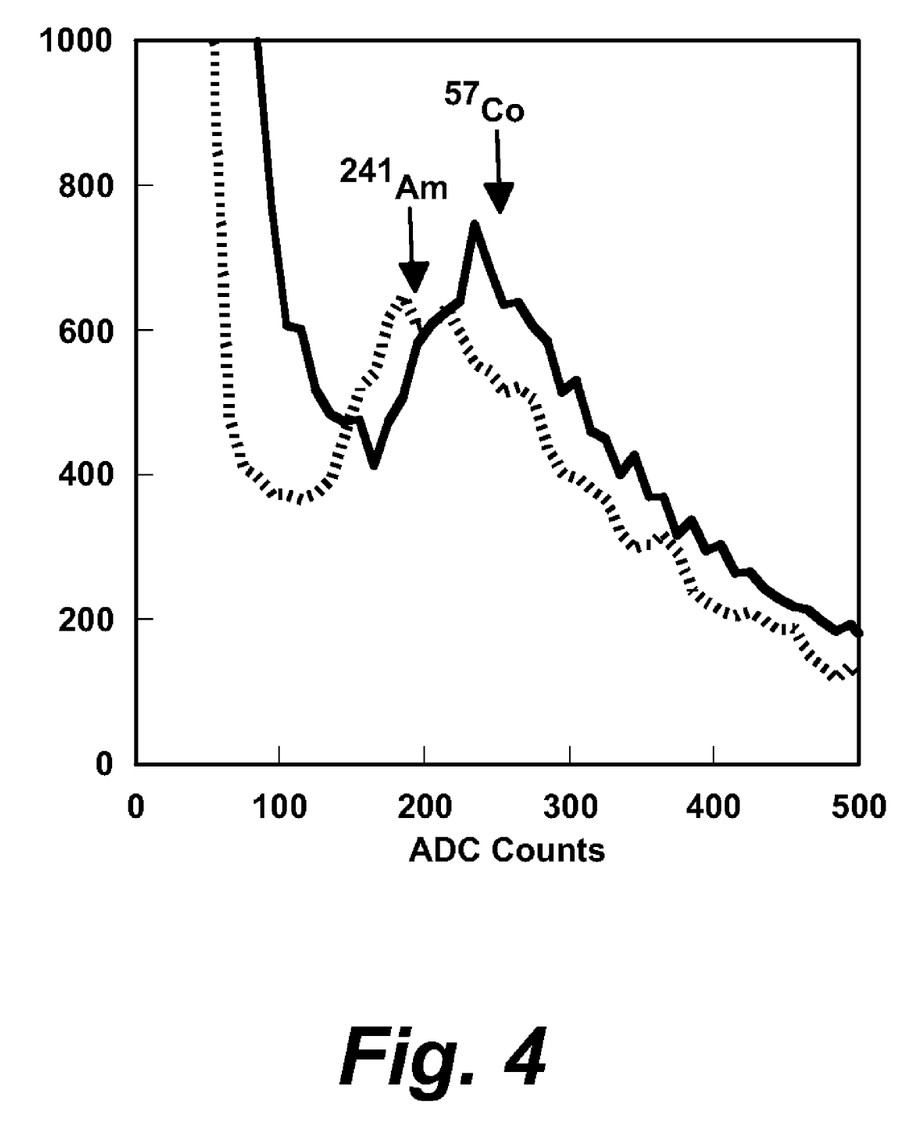
FIG. 4 shows an energy spectrum of the nanocomposite of FIG. 1a after the nanocomposite is irradiated using a $^{57}Co$ source (solid line) and a $^{241}Am$ source.

FIG. 4 shows a spectrum of the nanocomposite upon irradiation using a $^{57}$Co source (solid line) and a $^{241}$Am source. This spectrum demonstrates that the nanocomposite scintillator may be used to detect radiation. $^{57}$Co has two dominant characteristic gamma rays at 122 keV (85.9 percent per decay) and 136 keV (10.4 percent per decay). Photoelectric interactions of these gamma rays with the nanocomposite scintillator are observed as the broad peak centered below 300 ADC counts. Compton interactions of these gamma rays form the sharply rising edge observed below 150 ADC counts. $^{241}$Am has a dominant characteristic gamma ray at 60 keV (30 percent per decay). Photoelectric interactions of these gamma rays with the nanocomposite scintillator are observed as the broad peak at about 225 ADC counts. Compton interactions of these gamma rays form the sharply rising edge below 100 ADC counts. This demonstrates that this scintillator may be used to measure the energy spectrum of nuclear radiation.

EXAMPLE 2

An embodiment composition of lanthanum fluoride doped with cerium (40 mol percent cerium) and having 1 equivalent of capping oleic acid ligand was prepared as follows: A aqueous solution was prepared by combining LaCl$_3$.7H$_2$O (2.82 grams, 7.62 mmol) and Ce(NO$_3$)$_3$.6H$_2$O (2.20 grams, 5.08 mmol) deionized water (80 milliliters). This solution was added dropwise over 30 minutes to a heated solution (about 78° C.) of sodium fluoride (1.6 grams, 38.1 mmol) and oleic acid (3.6 grams, 12.1 mmol) in 200 ml of solvent (1:1 water:ethanol), resulting in the slow formation of a waxy white precipitate. The reaction mixture was allowed to stir at about 78° C for one hour after the total addition of the lanthanum and cerium solution. After cooling to room temperature, the solvent was decanted away from the white waxy solid. The solid was washed by sonication in 100 ml of ethanol for about 30 minutes. The solution was then centrifuged at 3000 rpm for 30 minutes. The ethanol was decanted from the waxy white solid, and the washing and centrifugation were repeated four times. The solid was then air dried at room temperature overnight, resulting in a transparent nanocomposite of the invention.

EXAMPLE 3

An embodiment composition of lanthanum fluoride doped with cerium (60 mol percent cerium) and having 1 equivalent of capping oleic acid ligand was prepared according to EXAMPLE 2 with the exception that the Ce/La solution was prepared by combining 1.89 grams (5.08 mmol) of LaCl$_3$.7H$_2$O and 3.31 grams (7.62 mmol) of Ce(NO$_3$)$_3$.6H$_2$O in 80 ml of deionized water.

EXAMPLE 4

An embodiment composition of lanthanum fluoride doped with cerium (80 mol percent cerium) and having 1 equivalent of capping oleic acid ligand was prepared according to EXAMPLE 2 with the exception that the Ce/La solution was prepared by combining 0.94 grams (2.54 mmol) of LaCl$_3$.7H$_2$O and 4.41 grams (10.16 mmol) of Ce(NO$_3$)$_3$.6H$_2$O in 80 ml of deionized water.

EXAMPLE 5

An embodiment composition of cerium fluoride having 1 equivalent of capping oleic acid ligand was prepared according to EXAMPLE 2 with the exception that the Ce-containing solution was prepared by adding 3.0 grams (6.90 mmol) of Ce(NO$_3$)$_3$.6H$_2$O to 50 ml of deionized water (no lanthanum chloride was used), and the solution of sodium fluoride and oleic acid was half the scale of EXAMPLE 2.

EXAMPLE 6

An embodiment composition of lanthanum fluoride doped with cerium (20 mol percent cerium) and having 2 equivalents of capping oleic acid ligand was prepared according to EXAMPLE 1 with the exception that the oleic acid solution was prepared by adding 1.6 grams (38.1 mmol) sodium fluoride and 6.5 grams (23.0 mmol) oleic acid in 200 ml of a 1:1 water:ethanol solvent.

EXAMPLE 7

An embodiment composition of lanthanum fluoride doped with cerium (20 mol percent cerium) and having 4 equivalents of capping oleic acid ligand was prepared according to EXAMPLE 1 with the exception that the oleic acid solution was prepared by adding 1.6 grams (38.1 mmol) sodium fluoride and 13.0 grams (46.1 mmol) oleic acid in 200 ml of a 1:1 water:ethanol solvent.

EXAMPLE 8

An embodiment composition of lanthanum fluoride doped with cerium (20 mol percent cerium) and having 0.5 equivalents of capping oleic acid ligand was prepared according to EXAMPLE 1 with the exception that the oleic acid solution was prepared by adding 1.6 grams (38.1 mmol) sodium fluoride and 1.63 grams (5.8 mmol) oleic acid in 200 ml of a 1:1 water:ethanol solvent, and that the centrifugation was performed at a speed of about 5000 rpm for 30 minutes.

EXAMPLE 9

An embodiment composition of lanthanum fluoride doped with cerium (20 mol percent cerium) and having 0.1 equivalents of capping oleic acid ligand was prepared according to EXAMPLE 1 with the exception that the oleic acid solution was prepared by adding 1.6 grams (38.1 mmol) sodium fluoride and 0.36 grams (1.3 mmol) oleic acid in 200 ml of a 1:1 water:ethanol solvent, and that the centrifugation was performed at a speed of about 5000 rpm for 30 minutes.

EXAMPLE 10

An embodiment composition of lanthanum fluoride doped with cerium (20 mol percent cerium) and having 2 equivalents of capping oleic acid ligand was prepared according to EXAMPLE 1 with the exception that the oleic lo acid solution was prepared by adding 1.6 grams (38.1 mmol) sodium fluoride and 6.5 grams (23.0 mmol) oleic acid in 200 ml of a 1:1 water:ethanol solvent and that the centrifugation was performed at a speed of about 5000 rpm for 30 minutes.

EXAMPLE 11

An embodiment composition of lanthanum bromide doped with cerium (15 mol percent) was prepared as follows: A solution of La(OTf)$_3$ (0.10 grams, 0.17 mmol) and Ce(OTf)$_3$ (0.02 grams, 0.03 mmol) in 10 ml of the ionic liquid N-butyl-N-methylpyrrolidinium bistrifylamide (C$_4$mpyTf$_2$N) was prepared. This solution was added dropwise over 30 minutes to a heated solution (about 120° C.) of cetyltrimethylammonium bromide (0.12 grams, 0.55 mmol) in C$_4$mpyTf$_2$N (10 ml), resulting in the slow formation of a white precipitate. The reaction mixture was allowed to stir at about 120° C. for about one hour after the total addition of the lanthanum and cerium solution, after which time it was cooled to room temperature and stirred an additional 96 hours. To this solution, 30 ml of ethanol was added. The resulting solid was washed by sonication for 30 minutes. The slurry that formed was centrifuged at 5000 rpm for 90 minutes, resulting in a waxy white solid and ethanol supernatant. The ethanol was decanted from the waxy white solid, and the washing and centrifugation was repeated two times. The solid was then air dried at room temperature overnight.

EXAMPLE 12

A composition of a mixed halide and chalcogen (oxygen for this EXAMPLE) was prepared as follows: A solution La(OTf)$_3$ (0.116 grams, 0.198 mmol) and Ce(OTf)$_3$ (0.018 grams, 0.03 mmol) in 3 ml of the ionic liquid N-butyl-N-methylpyrrolidinium bistrifylamide (C$_4$mpyTf$_2$N) was prepared. This solution was added dropwise over 30 minutes to a heated solution (about 50° C.) of N-butyl-N-methylpyrrolidinium bromide (0.18 g, 0.8 mmol) in 3 ml of C$_4$mpyTf$_2$N. The reaction mixture was allowed to stir overnight, resulting in a white precipitate. The reaction mixture was centrifuged at 3500 rpm for 30 minutes. The supernatant was decanted away from the solid. About 30 ml of methylene chloride was added to the solid and that mixture was sonicated for about 20 minutes, and then centrifuged at 3500 rpm for 30 minutes. The sonication and centrifugation were repeated twice more, resulting in the embodiment composition.

EXAMPLE 13

Figure 5A:
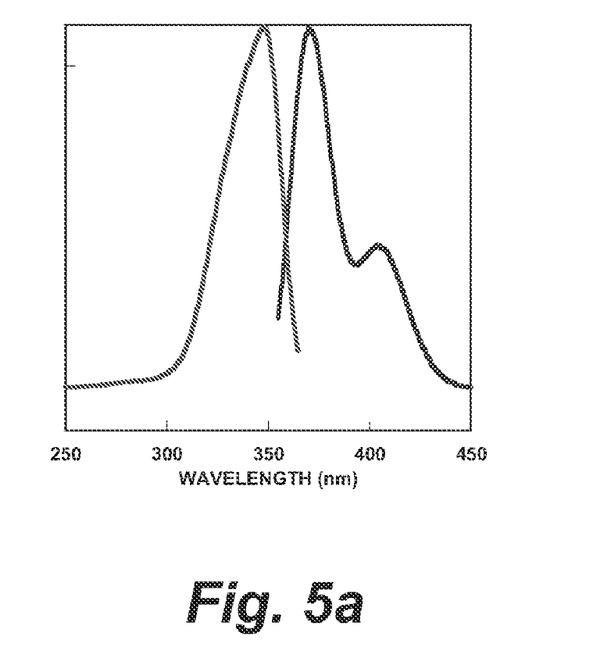
FIG. 5a shows a photoluminescence excitation spectrum and an emission spectrum of a Ce doped $LaBr_3$ nanocomposite.
Figure 5B:
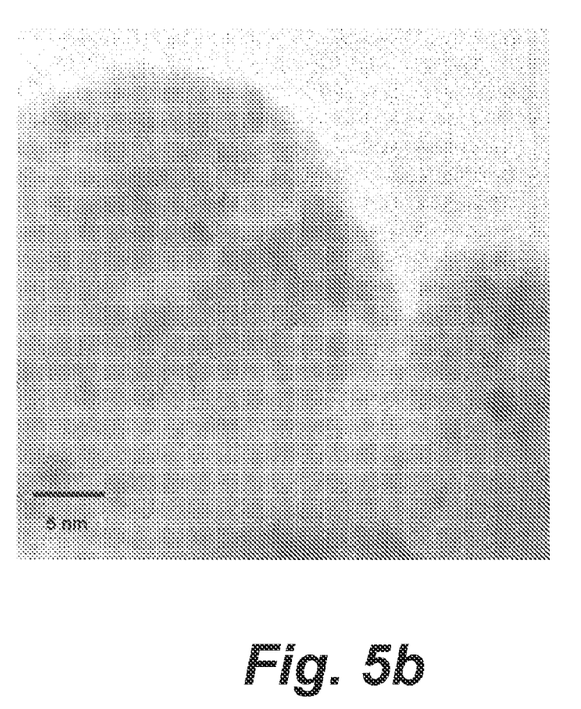

An embodiment composition of lanthanum bromide doped with cerium (5 mol percent) was prepared as follows: A solution of La(N[Si(CH$_3$)$_3$]$_2$)$_3$ (1.47 grams, 2.38 mmol) and Ce(N[Si(CH$_3$)$_3$]$_2$)$_3$ (0.81 grams, 0.13 mmol) in 70 ml of 1-octadecene was prepared and heated to 160° C. This solution was added dropwise over 30 minutes to a heated solution (about 160° C.) of tetahexylammonium bromide (4.0 grams, 14.2 mmol) and oleic acid (4.16 grams, 14.7 mmol) in octadecene (50 ml), resulting in the quick formation of a pale yellow precipitate. The reaction mixture was allowed to cool to room temperature and stirred an additional 12 hours. The reaction solution was centrifuged at 5000 rpm for 30 minutes, resulting in a waxy white solid. The octadecene was decanted from the waxy white solid, and the washed with toluene, and centrifugation was repeated. The waxy pale yellow solid was then air dried at room temperature overnight. FIG. 5a shows a photoluminescence excitation spectrum and an emission spectrum of the Ce doped LaBr$_3$ nanocomposite, and FIG. 5$b$ shows a TEM image of the nanocomposite.

EXAMPLE 14

An embodiment composition of cerium bromide was prepared as follows: A solution of Ce(N[Si(CH$_3$)$_3$]$_2$)$_3$ (1.15 grams, 2.51 mmol) in 70 ml of 1-octadecene was prepared and heated to 160° C. This solution was quickly added to a heated solution (about 160° C.) of tetahexylammonium bromide (4.0 grams, 14.2 mmol) and oleic acid (4.16 grams, 14.7 mmol) in octadecene (50 ml), resulting in the quick formation of a pale yellow precipitate. The reaction mixture was allowed to cool to room temperature and stirred an additional 12 hours. The reaction solution was centrifuged at 5000 rpm for 30 minutes, resulting in a waxy white solid. The octadecene was decanted from the waxy white solid, and the washed with toluene, and centrifugation was repeated. The waxy pale yellow solid was then air dried at room temperature overnight.

EXAMPLE 15

An embodiment composition of cerium chloride was prepared as follows: A solution of La(N[Si(CH$_3$)$_3$]$_2$)$_3$ (0.5 grams, 1.1 mmol) in 10 ml of acetonitrile was prepared. This solution was quickly added to a heated solution (about 60° C.) of diethylammonium chloride (0.5 grams, 4.6 mmol) and oleic acid (0.32 grams, 1.1 mmol) in acetonitrile (10 ml), resulting in the quick formation of a white precipitate. The reaction mixture was allowed to cool to room temperature and stirred an additional 12 hours. The reaction solution was centrifuged at 5000 rpm for 30 minutes, resulting in a waxy white solid and ethanol supernatant. The acetonitrile was decanted from the waxy white solid, and the washing and centrifugation was repeated two times. The solid was then air dried at room temperature overnight.

In summary, fast, bright, rare earth doped (and undoped) nanophosphors may be prepared easily and inexpensively in a form suitable for the fabrication of large area radiation detectors. Some of the preparations involve a controlled precipitation reaction, capping ligands such as large-tail organic compounds, a source of acidic halide, and a centrifugation step. In some cases, centrifuging a reaction mixture at relatively slow speeds unexpectedly results in a transparent nanocomposite useful as a high light output scintillator for large area radiation detectors.

The foregoing description of the invention has been presented for purposes of illustration and description and is not intended to be exhaustive or to limit the invention to the precise form disclosed, and obviously many modifications and variations are possible in light of the above teaching. For example, $^6$Li or $^{10}$B may be incorporated into a nanocomposite of the invention for thermal neutron detection, where the charged reaction products of the neutron capture excite the phosphor.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing a lanthanide halide nanophosphor, comprising:
    preparing a first solution comprising at least one lanthanide triflate precursor dissolved in an ionic liquid solvent that is a good solvent for the at least one soluble lanthanide triflate complex but a poor solvent for the lanthanide halide nanophosphor, and
    adding the first solution dropwise to a second solution of a source of acidic halide under conditions suitable for a chemical reaction to occur that results in a product that comprises a lanthanide halide nanophosphor.

2. The method of claim 1, further comprising:
    washing the product with a liquid to form a slurry, and
    subjecting the slurry to centrifugation, whereby the liquid used for washing the slurry separates during centrifugation as a supernatant above a solid that comprises the lanthanide halide nanophosphor.

3. The method of claim 1, wherein the at least one lanthanide triflate precursor is at least one selected from lanthanum triflate and cerium triflate.

4. The method of claim 1, wherein the source of acidic halide is selected from cetyltrimethylammonium bromide and N-butyl-N-methylpyrrolidinium bromide.

* * * * *